July 27, 1943.   H. O. ELFTMAN   2,325,490
PRESSURE INDICATING METHOD AND APPARATUS
Filed Jan. 9, 1942   2 Sheets-Sheet 1
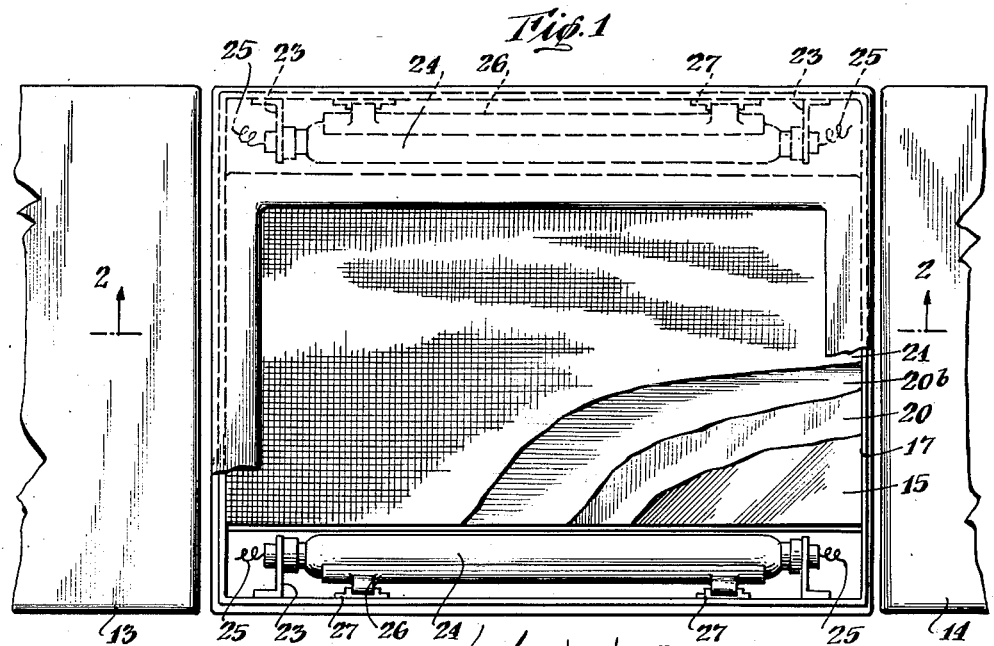
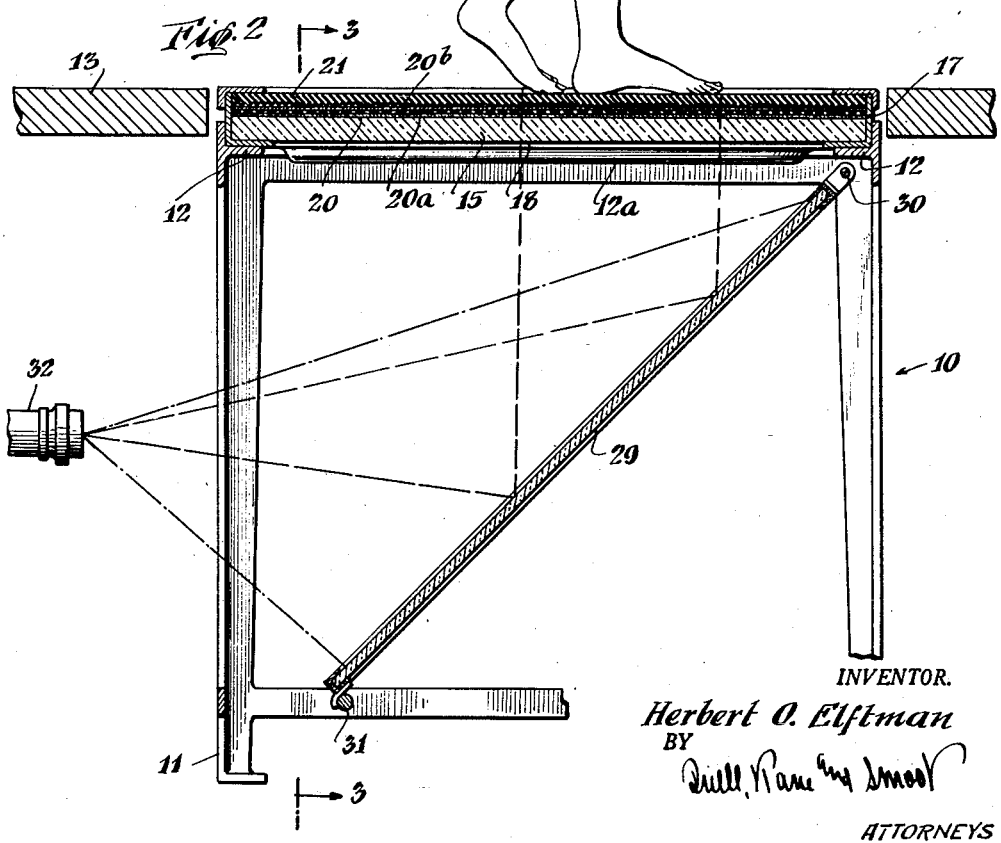
INVENTOR.
Herbert O. Elftman
BY
ATTORNEYS

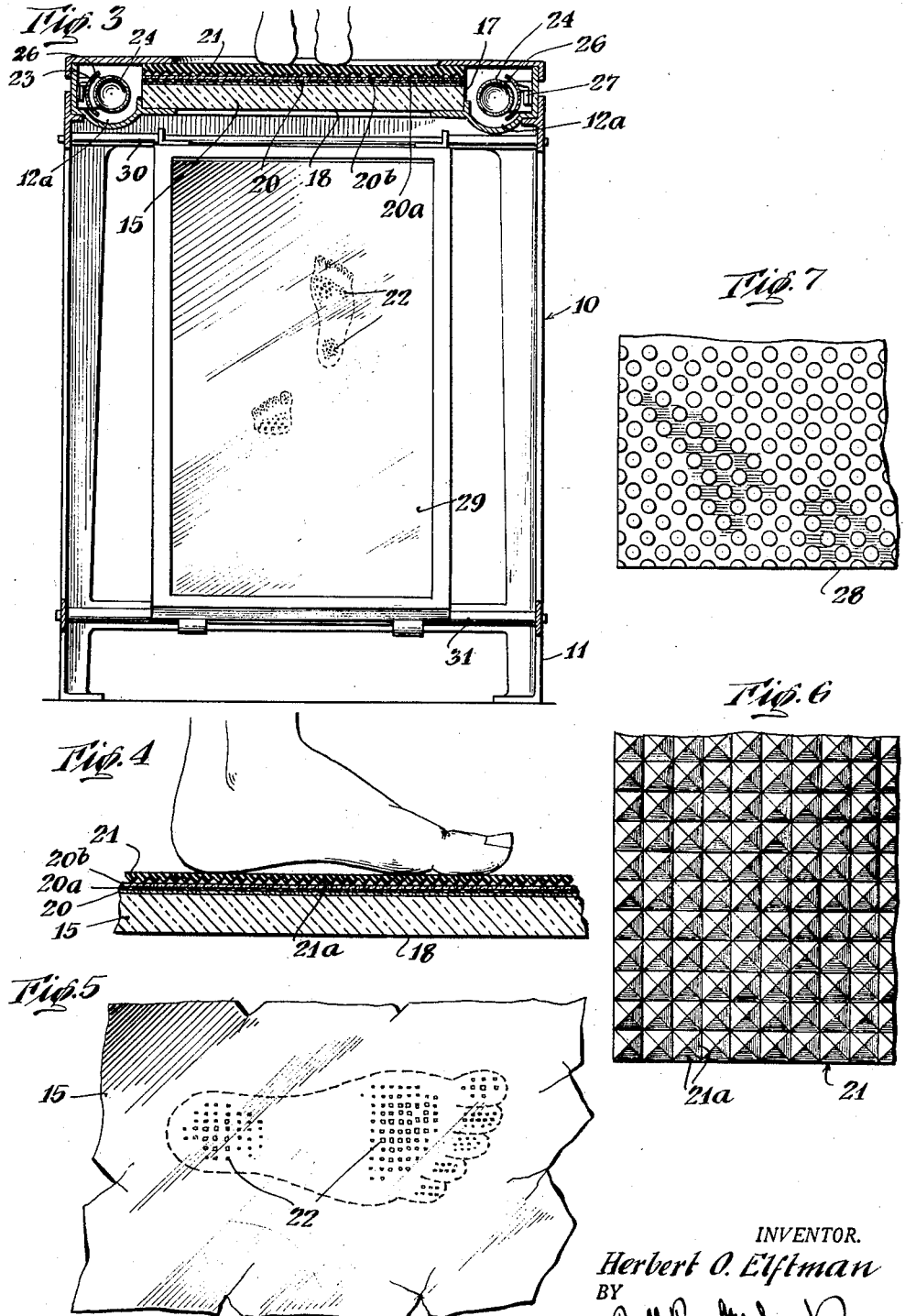

Patented July 27, 1943

2,325,490

UNITED STATES PATENT OFFICE 2,325,490

PRESSURE INDICATING METHOD AND APPARATUS

Herbert O. Elftman, Leonia, N. J.

Application January 9, 1942, Serial No. 426,187

6 Claims. (Cl. 88—74)

This invention relates to a method and apparatus for translation of physical pressure areas into readily apparent visual forms.

A major object of this method and the apparatus therefor is to provide a means of seeing or recording the distribution of pressure of a human foot, either when the subject is standing still or moving.

In carrying out the present invention, it has been my aim to utilize a method and apparatus comprising only a relatively few simple, rugged and easily handled and arranged parts, thus avoiding the necessity for the use of such things as printing inks, plaster, fluids or other materials which might be difficult or inconvenient to use.

In achieving the above, it has been a further aim to provide an apparatus for indicating varying amounts or degrees of pressure as well as the areas of pressure and to provide visual pressure areas of sufficient size, light intensity and visibility to be easily seen without magnification and to be readily photographed.

While in the accompanying illustrations, I have illustrated a human foot as being the subject about which pressure areas as well as variations in pressure are desired, it is quite apparent that my method and apparatus are equally adaptable to any type of object whose area of contact is desired, or whose varying areas of contact as well as variations in degree of pressure may be desired. For example, the present invention is highly adaptable to the recording of fingerprints and may be used for many other similar or related purposes.

The present invention is, therefore, not to be limited for use in conjunction solely with the human foot, but is broad enough to cover other uses where varying physical contact pressure area study is desired.

My invention consists broadly in the utilization of reflective light and in varying the shapes and intensity of the reflections dependent upon the varying applications of pressure to a material placed so as to control the reflection of the light in accordance with the pressure variations.

In the drawings:

Fig. 1 is a top plan view of the apparatus with certain sections cut away to illustrate the superimposition of parts;

Fig. 2 is a vertical cross section along the lines 2—2 of Fig. 1 and looking in the direction of the arrows, and illustrating schematically the arrangement of parts for photographing the visual pressure areas;

Fig. 3 is a vertical, cross sectional view taken along lines 3—3 of Fig. 2 and looking in the direction of the arrows;

Fig. 4 is an enlarged schematic view to show more clearly the reflective structure and its manner of use.

Fig. 5 is a bottom view of Fig. 4 illustrating one form in which the points of pressure contacts may be formed and the varying areas as they right appear;

Fig. 6 is a plan view of one form of pressure receiving mat for use in conjunction with my invention; and Fig. 7 is an alternative form of a pressure receiving mat likewise for use in conjunction with my invention.

The apparatus illustrated comprises a rectangular box-like frame 10 provided with depending legs 11 and an upper retaining angle 12 of sufficient strength to support a person walking across it, and a sufficient size to enable a person to take a number of steps within its area. The size and specific arrangement can be varied of course, to meet the varying requirements to which apparatus of this kind is subjected. As illustrated, this frame 10 is adapted to be mounted or positioned between two tables 13 and 14 which serve as walking areas leading up to the apparatus.

Mounted within and near the top of this frame and supported by retaining angle 12, is a casing 12a adapted to support plate 15 which must be capable of transmitting light and in preferred form is transparent and may be made of glass, Lucite or other similar material and which is of sufficient strength and rigidity or is so braced by supports as to enable a person to walk across it. This plate is preferably of flat, rectangular form having horizontal upper and lower surfaces 17 and 18 respectively, and side edges which, as shown, comprise flat vertical surfaces but whose surface shape may vary dependent on circumstances hereinafter to be described.

Directly above this plate and lying on its upper horizontal face, is positioned a light reflective material 20 which may take varying forms but which should have characteristics enabling it to be pressed into contact with the plate 20 upon an application of pressure against it, and thereafter upon a release of the pressure, be able to return approximately to its former position and not remain adhered to the plate surface.

Any reflective material which meets these essential requirements may be used. I have found that opaque Pliofilm, Pliofilm or Cellophane with painted surfaces, and oilcloth are highly desirable. In the use of material having painted surfaces, it is obvious that the painted area may be used either in contact with the upper horizontal surface 17 of plate 15 or may be faced away from that surface. If the latter placement is used, the light being largely reflected from the painted surface must first pass through the material bearing the painted surface.

While any of these arrangements have proven satisfactory, it has been found that the most desirable arrangement consists in placing adjacent the plate 15 a Pliofilm surface 20 with the painted reflective surface thereon 20a not in contact with the face 17 of the plate. The Pliofilm being thus directly against the plate and not the painted or reflective surface, the paint is not in danger of sticking to the plate, thus allowing non-pressure positions to be restored when the pressure is removed. Over this layer of Pliofilm, a further layer of Pliofilm 20b is placed which layer serves to protect the painted reflective surface and thus enables good reflective qualities of the material to be retained for long periods of time.

Additionally, this reflecting surface must be a material which in the areas under pressure, presents an irregular or diffuse reflecting surface. The materials above mentioned are all of this type. Further, if desired, this reflecting surface may be formed from particles of reflective materials embedded in plastics or other substances, whereby a greater diffusion of light may occur.

Inasmuch as the important object is to bring the reflective material into intimate contact with the plate at the points of applied pressure, the object whose pressure is sought may be placed directly on this material. On the other hand, if desired, there may be interposed between this reflective material and the object whose pressure points are sought, an intermediate pressure receiving mat. It is to be remembered, however, that the interpositioning of this mat may not be essential and may or may not be used as desired.

As shown, there is interposed a mat 21 made of a flexible material such as rubber, felt or other material capable of being deformed and then returning to its original shape. The irregular contours of the mat 21 rest upon the reflective material, while the oppositely disposed face of this mat is the surface upon which the object whose pressures are to be noted is placed. The form of the mat illustrated in the Figs. 2, 3, 4 and 5 consists of a rubber mat with the lower surface comprising a group of pyramid shaped projections 21a with their apexes slightly flattened. It is, of course, apparent that pressure on the upper or flat surface of that mat will cause the apexes of the pyramids to be pushed towards the plate 15, thus causing the intermediary reflective surface 20 to be brought into more intimate contact with the upper surface 17 of the plate 15 and eliminating at that point the normal air dividing space. Due to the natural flexibility of the pressure mat 21, it is apparent that the greater the pressure, the more will the apex of the pyramids be compressed, and consequently the broader area of contact which they will cause the reflective surface 20 to make with the plate 15. Fig. 5 illustrates the varying size images 22 which the pressure areas of the pyramids create and the manner in which the pressure areas and degree may be viewed by an observer. The smaller areas 22 indicate less applied pressure on the pressure mat at those points than at the points of larger areas.

It is of course, clear that the main purpose of the present invention is to provide a means and method of seeing the points of contact 22 which are created. Accordingly, the provision of light sources whereby the points 22 will be readily visible is one of the major objects of this invention.

As shown in Figs. 1 and 3, a light source is arranged on opposite edges of the plate 15 and in a position to pass directly into or reflect through the vertical edges 17 of that plate. One satisfactory manner of achieving this arrangement is to mount lamp supporting brackets 23 on the inside of casing 12a adjacent the side edges 17 of the plate 15, these brackets in turn holding lamp elements 24 which are connected to a source of electrical supply by conductors 25. Reflectors 26 mounted on casing 12a by means of brackets 27 serve to reflect the light from the lamps 24 through the vertical edges of the plate 15. If desired, a single light source might be utilized, or light sources might be placed on each of the four sides of the plate. This light entering through the vertical side edges of the transparent plate causes the pressure points 22 to appear as lighted areas against a darker background.

These apparently lighted pressure areas are very desirable in that they are easily visible and photographed readily. I have thus discovered a new and desirable method of converting pressure areas into very visible lighted areas and have designed apparatus to carry that invention into practice. While I believe that this specification and above description will enable those skilled in the art to readily follow my invention, I nevertheless desire to explain the reason for the lighted areas, as I understand it.

It is believed that the critical angle for the total reflection of light in either glass or Lucite, both of which substances are highly adaptable to form the transparent plate 15, is less than 45 degrees. In view of this, light which enters the plate 15 through the vertical side edges 17, will upon reaching the upper horizontal plate-air boundary surface and before a reflective surface is pressed against it, be totally reflected therefrom, and as this light travels inside of the plate 11 to the lower horizontal plate-air boundary 18, it will again be totally reflected from this lower horizontal face of the plate, and consequently this light will not emerge from the lower surface of the plate. However, (referring now to the case where the painted surface of the reflective material is not in contact with the transparent plate), when the reflective surface 20 is pressed into contact with the transparent plate 15 by means of pressure being applied directly to it as in the case where the object rests directly on the reflective surface or by means of the interposed pressure mat, if one is used, the index of refraction of the material which is pressed into contact with the transparent plate, as well as the index of refraction of the transparent plate, must be considered together and the critical angle for total reflection is increased. Under these conditions, some of the light which reaches the upper surface of the transparent plate is refracted into the superimposed substance and is then reflected by either the superimposed substance itself, or by the reflecting surface 20a, which is on the uper surface of the superimposed substance 20. If this additional reflecting surface was perfectly parallel to the upper surface of the plate, very little would be gained, since the light reflected from it would pursue a course parallel to that of the reflected rays, if there had been no superimposed substance, and accordingly, would again not leave the lower surface of the plate. However, since the reflecting surface of the materials mentioned, such as Pliofilm, Cellophane, opaque Pliofilm, oilcloth, etc., are all irregular or diffuse reflectors, the reflection is diffused and some of the reflected rays emerge through the lower surface of the transparent plate. It is these diffused rays which come from the areas of contact 22, which cause the areas of contact to appear light against a dark background.

While the above explanation discussed a situation in which the painted area was spaced from the transparent plate, the same situation and explanation applies to the case where the painted or reflective surface is directly adjacent to the plate with the exception that the light rays then do not pass through a superimposed substance before reflection.

It is to be borne in mind that since the lighted areas are due to reflected light, a shaping or bevelling of the vertical surfaces through which the light enters, in a degree dependent upon the index of refraction of the transparent plate, might be utilized to cause the light rays to reflect with greater intensity and changes of this nature which are known to those skilled in the art, are broadly within the teachings of my invention.

In one form of my invention, the points of pressure contact 22 may be made to appear as darkened against a lighter background, rather than light as has previously been described. In this form, the only difference is that the light source is not passed through the vertical side edges of the glass or Lucite plate, but through the lower horizontal surface. These darkened points of pressure contact may have their contrast with the light reflective material increased if the raised portions of the mat which is pressing against the reflecting sheet contrast in color with the reflective sheet and provided of course, that the reflecting sheet allows part of the light to penetrate through it. The primary effect, however, of the darkened areas is not due to this color contrast, but merely to the scattering of the light entering from below the bottom horizontal plane surface and reflected from the contact area.

Where a pressure mat is used, its form may be varied so long as the essentials of the raised, flexible areas is present. In Fig. 7 there is illustrated a desirable form of rubber mat 28 comprising raised round projections 28a. The shape and area of the raised portions as well as their flexibility may be varied according to the pressures to be applied.

In order to provide means of viewing the pressure areas without having to look upward on the underside of the transparent plate, I have provided the apparatus with a mirror 29 which is hinged in the frame 10 by means of pin 30 and adapted for swinging adjustable movement so as to rest against stop 31 which may be constructed for placement in varying positions. By this means the image is projected forward to an observer or where desired, a camera 32 may be mounted in front of the apparatus for the photographic recording of the pressure areas.

The mode of operation of the method and apparatus is obvious from the above, and accordingly, is not separately described. Having now set forth my invention, I wish it understood that I do not limit myself to the specific embodiments herein described, except as may be required by the appended claims.

I claim:

1. An apparatus for creating visual areas corresponding to areas of applied pressure, comprising a transparent plate, a solid resilient light reflective material overlying and normally partially spaced from said plate, a light source directed through said plate, and to said reflective surface, whereby when areas of pressure press said reflective material into contact with said plate, said pressed areas appear in visual contrast to unpressed areas.

2. An apparatus for creating visual areas corresponding to areas of applied pressure, comprising a transparent plate having side edges and substantially horizontal upper and lower faces, a solid resilient light reflective sheet material overlying and normally partially spaced from said upper face, a light source directed through a side edge of said plate, whereby when areas of pressure compress said reflective material into contact with said plate, light rays from said light source which had previously not reflected from said upper plate surfaces to and through said lower plate surface, now reflect from said upper surface or said light reflective material and pass through the lower surface of said plate.

3. A device for changing physical pressures to lighted areas comprising a transparent plate having side edges and substantially horizontal and spaced top and bottom faces, a light source directing light into said plate, a translucent solid resilient reflective material lying on said upper horizontally disposed face and in normal unpressed engagement therewith, whereby when areas of pressure press said translucent reflective material into contact with said plate, said points of contact create reflective areas characterized by their capability of reflecting light to pass through the lower horizontal face of said plate, which light had previously been unable to pass through said face.

4. An apparatus for creating visual areas corresponding to points of applied pressure comprising a transparent plate, means for illuminating said plate, solid resilient reflective means superimposed on said plate, a pressure mat superimposed on said reflective means, and raised areas carried by said mat and in contact with said reflective means and adapted to press said reflective means into contact with said transparent plate.

5. An apparatus for creating visual areas corresponding to points of applied pressure comprising a transparent plate, means for illuminating said plate, resilient reflective means, a pressure mat superimposed on said reflective means, raised areas carried by said mat and in contact with said reflective means and adapted to press said reflective means into contact with said transparent plate, and a mirror angularly disposed with reference to said transparent plate and adapted to receive and reflect images appearing on said plate.

6. An apparatus for creating visual areas corresponding to areas of applied pressure comprising a transparent plate provided with parallel horizontal surfaces and edge surfaces, a solid light reflective, resilient material loosely overlying said plate, a flexible mat having one surface adapted to permit an object to be placed thereon and having the other surface comprising a series of raised flexible areas in contact with said light reflective material, a light source directed through the edges of said transparent plate whereby areas of pressure from an object placed on said mat press said reflective material into contact with said plate, said pressed areas thereby reflecting said light at angles permitting said light rays to pass through a horizontal surface of said transparent plate.

HERBERT O. ELFTMAN.